G. BURDETT.
TOY THAUMATROPE.

No. 171,986. Patented Jan. 11, 1876.

WITNESSES, INVENTOR,

Silas Skillin George Burdett.

UNITED STATES PATENT OFFICE.

GEORGE BURDETT, OF PROVIDENCE, RHODE ISLAND.

IMPROVEMENT IN TOY THAUMATROPES.

Specification forming part of Letters Patent No. 171,986, dated January 11, 1876; application filed June 19, 1875.

*To all whom it may concern:*

Be it known that I, GEORGE BURDETT, of the city and county of Providence, in the State of Rhode Island, have invented a new and Improved Optical Toy, of which the following is a specification:

In the accompanying drawing, like letters indicate like parts.

Figures 1, 2:
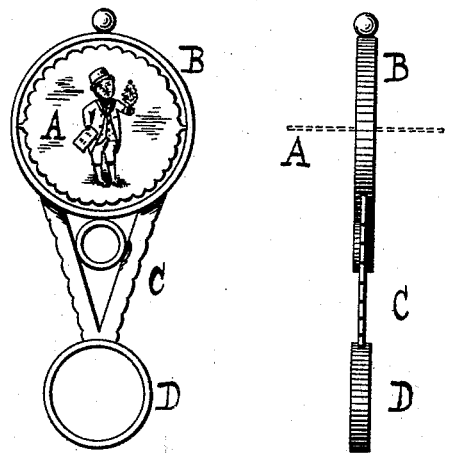
Figure 3:
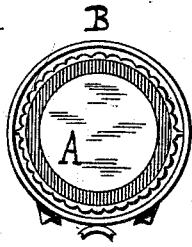
Figure 4:
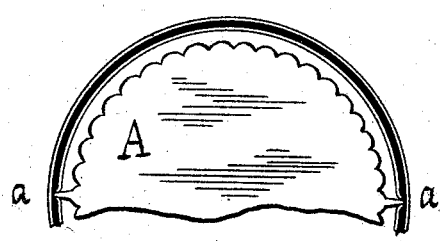

Figure 1 is a front view of my invention. Fig. 2 is a side view of the same. Fig. 3 shows the reverse of the revolving disk. Fig. 4 is an enlarged view, showing the method of suspending the disk.

My invention is designed to illustrate the familiar optical phenomenon known as "the persistence of vision," whereby figures upon the opposite sides of a revolving disk seem to unite into one continuous view. This is usually shown by a disk furnished with strings at its opposite sides, which, being twisted or twirled by the fingers, cause the disk to revolve rapidly.

In my invention I suspend the disk within a supporting-ring, connected with a suitable handle for holding the whole.

The figures may be varied—as, for instance, an empty cage may be shown on one side of the disk and a bird on the other side, which, by the rapid revolution, will appear together in one picture, presenting the optical illusion of the bird within the cage.

The figures appearing in the accompanying drawing combine by showing the man on the obverse of the disk surrounded by the circular band upon the reverse.

In the drawings, A represents the revolving disk, suspended in its frame B. This frame is countersunk at its opposite inner sides, as shown in Fig. 4, into which depressions enter the swivels $a\ a$, which project from the disk to furnish the axis of its revolution. From the frame B extends a handle, C, terminating at the lower end in a smaller circular piece, D, which serves as a finger-ring to hold the toy.

The disk is revolved by blowing upon it, and so the optical effect is obtained.

What I claim as my invention, and desire to secure by Letters Patent, is—

The combination of the stationary frame B and handle C D with the revolving disk A, suspended as described, and provided upon each face with a picture, or part of a picture, the whole forming an optical toy to illustrate the persistence of sight, substantially as specified.

GEORGE BURDETT.

Witnesses:
SILAS SKILLIN,
CHAS. A. WILSON.